United States Patent

Aldcroft et al.

[11] Patent Number: 6,039,798
[45] Date of Patent: Mar. 21, 2000

[54] SILICA PRODUCTS AND UV CURABLE SYSTEMS

[75] Inventors: Derek Aldcroft, South Wirral; Sharron Bates, Sandbach; Graham James Earl, Winsford, all of United Kingdom

[73] Assignee: Crosfield Limited, United Kingdom

[21] Appl. No.: 09/029,416

[22] PCT Filed: Jul. 20, 1996

[86] PCT No.: PCT/EP96/03246

§ 371 Date: Feb. 12, 1999

§ 102(e) Date: Feb. 12, 1999

[87] PCT Pub. No.: WO97/08250

PCT Pub. Date: Mar. 6, 1997

[30] Foreign Application Priority Data

Aug. 29, 1995 [GB] United Kingdom .................... 9517607

[51] Int. Cl.[7] .............................. C08L 91/06; C09D 1/02; C08K 9/00; C08J 3/28
[52] U.S. Cl. ....................... 106/272; 106/287.34; 522/83; 522/96; 522/103; 523/209; 523/300
[58] Field of Search ................................. 522/83, 96, 103; 106/270, 287.34, 272; 523/209, 300

[56] References Cited

U.S. PATENT DOCUMENTS

| 4,097,302 | 6/1978 | Cohen et al. ............................ 106/312 |
| 4,206,025 | 6/1980 | Vrancken et al. ....................... 522/104 |
| 5,318,808 | 6/1994 | Crivello et al. ........................... 522/80 |
| 5,585,415 | 12/1996 | Gorzalski et al. ......................... 522/81 |
| 5,637,636 | 6/1997 | Cartwright et al. ..................... 524/493 |

FOREIGN PATENT DOCUMENTS 0 541 359   5/1993   European Pat. Off. .......... C09C 1/30

*Primary Examiner*—Susan W. Berman

[57] ABSTRACT

Wax coated silica matting agent wherein the silica is an amorphous silica having a pore volume of at least 1.5 $cm^3/g$, preferably at least 1.8 $cm^3/g$. The wax coating is present in the range from 6% to 15% by weight of the matting agent and comprises a synthetic polyethylene wax.

12 Claims, No Drawings

SILICA PRODUCTS AND UV CURABLE SYSTEMS

FIELD OF INVENTION

The invention relates to wax coated silica matting agents used in the matting of UV curable systems and to UV curable systems containing the same.

BACKGROUND TO THE INVENTION

UV curing is based on photoinitiated polymerisation of functional oligomers and monomers into a crosslinked polymer network. When an ultraviolet curable coating is exposed to UV energy in this way a relatively hard film, having an extremely smooth surface, and hence one of high gloss, is produced. With the increasing popularity of radiation cured coatings for a wide variety of applications, the ability to control and reduce gloss is becoming more important. It is well known that matt surfaces provide the finished article with a more elegant appearance and hide imperfections at the surface, particularly in wood, furniture and PVC flooring applications, and several different methods of reducing the gloss of UV curable coatings have been reported, for example the use of "dual cure" or "gradient intensity cure" techniques, specific photoinitiators and non-silica type matting agents.

Traditional silica matting agents are conveniently used to reduce the gloss of solvent and water based finishes and in the UV industry synthetic silicas are used to provide a semi-gloss or matt effect, although as a rule high concentrations are generally required by the formulator. The high solids nature of UV systems and the absence of adequate film shrinkage, required to ensure optimal levels of particles are present in the surface of the cured film, makes efficient matting difficult. Accordingly, high concentrations of conventional silicas are required to achieve an acceptable degree of gloss reduction. Such high levels of silica can frequently cause changes in the rheological properties of the lacquer which can be detrimental to the coating and curing process and, can impair the optical properties of the cured film.

In an attempt to overcome this problem, the use of large particle size silicas has been promoted in the past for both thin and thick film applications. Such materials may produce an unacceptable level of roughness particularly in thin coatings and, depending on the viscosity of the system, can result in a greater tendency to settle on prolonged storage. It would be desirable therefore to provide a synthetic silica matting agent for UV systems, having good efficiency and minimal effect on formulation viscosity and film properties.

There is therefore a need for a new matting agent which overcomes these problems.

Definitions and Test Procedures i. Nitrogen surface area—pore volume

Nitrogen surface area is determined by standard nitrogen adsorption methods of Brunauer, Emmett and Teller (BET) using a multi point method with an ASAP 2400 apparatus supplied by Micromeritics of the U.S.A. The samples are outgassed under vacuum at 270° C. for at least one hour before measurement. Surface area is calculated from the volume of nitrogen gas adsorbed at p/po 0.98. This apparatus also provides the pore size distribution from which it is possible to get the pore size ($D_{10}$) for which 10% of the pores are below this pore size. In the same manner, it is possible to get the pore size for which 50% ($D_{50}$) and 90% ($D_{90}$) of the pores are below this pore size. Additionally the pore volume ($cm^3/g$) for a given range of pore size can be obtained from the desorption curve.

ii. Matting efficiency in UV systems

In order to test the matting efficiency, two commercial UV curable systems have been chosen for the study, one is a urethane acrylate formulation (Formulation 2) and one is representative of an epoxy acrylate formulation (Formulation 1), details of which are given in the following Table.

| Formulation 2 | % | Formulation 1 | % |
| --- | --- | --- | --- |
| EBECRYL 294 | 62.1 | EBECRYL 608 | 44.7 |
| N-vinyl pyrrolidone | 9.5 | OTA 480 | 22.2 |
| 2-ethyl hexyl acrylate | 19.2 | TPGDA | 22.2 |
| Benzophenone | 2.85 | Benzophenone | 3.3 |
| DAROCUR 1173 | 0.95 | IRGACURE 651 | 2.2 |
| Silica matting agent | 5.4 | Silica matting agent | 5.4 |

For the preparation of the formulations the following procedure was adopted. The binder and diluent were added to a 60 ml amber glass jar and stirred at 8000 rpm for 1 minute using an IKA Ultra Turrax T25 homogeniser. The remaining additives and silica were then combined by hand stirring, followed by dispersion at 8000 rpm for one minute. The systems were allowed to deaerate and then drawn onto black glass plates using either a 12 micron (Formulation 1) or a 40 micron bar applicator (Formulation 2). The plates were cured on a single pass, in line with normal industrial practice, under a Fusion H-bulb (mercury lamp, 120 W/cm) using a line speed of 3.5 meters/minute. The glossmeter readings at 60° (gloss) and 85° (sheen) were measured, by a BYK multiglossmeter.

iv. Weight mean particle size

The weight mean particle size is determined with the aid of a Malvern Mastersizer using 100 mm path length lens. This instrument, made by Malvern Instruments, Worcestershire uses the principle of Fraunhoffer diffraction utilising a low power He/Ne laser Before measurement the sample was dispersed ultrasonically in water for a period of 7 minutes to form an aqueous suspension. The Malvern Mastersizer measures the weight particle size distribution of the silica. The weight mean particle size (d50), the 10 percentile ($d_{10}$) and the 90 percentile ($d_{90}$) are easily obtained from the data generated by the instrument.

v. Wax content of the coated silica

The carbon content of the coated silicas is determined by a Leco HF 100 induction furnace and Leco CS 244 Carbon analyser. The carbon present is converted to carbon dioxide at high temperatures using the induction furnace. The gas is then detected by an infra-red detection system. The wax content (in % w/w) is calculated from the carbon level obtained.

GENERAL DESCRIPTION OF THE INVENTION

It is a first object of the present invention to provide a wax coated silica matting agent characterised in that the silica is an amorphous silica having a pore volume of at least 1.5 $cm^3/g$, preferably at least 1.8 $cm^3/g$, the wax coating being present in the range from 6% to 15% by weight of the matting agent and comprising a synthetic polyethylene wax having a melting point of less than 85° C., preferably less than 80° C.

Preferably, the wax coating is in the range from 10% to 15% by weight of the matting agent when the amorphous silica has a pore volume of less than 2.5 cm³/g.

It is a second object of the present invention to provide a UV curable system comprising 3 to 15% by weight of a matting agent wherein the mating agent is a wax coated silica, the silica being an amorphous silica having a pore volume of at least 1.5 cm³/g, preferably at least 1.8 cm³/g, the wax coating being present in the range from 6% to 15% by weight of the matting agent and comprising a synthetic polyethylene wax having a melting point of less than 85° C., preferably less than 80° C.

The wax coated silica matting agents are manufactured by a process that simultaneously melts the wax and comminutes the silica to the desired particle size distribution. Such a process is most effectively carried out in a fluid energy mill or microniser. The operating temperature can then be varied according to the requirements of the wax. The inlet temperature of the air being supplied to the fluid energy mill must be high enough to ensure the wax melts within the residence time profile of the milling equipment.

SPECIFIC DESCRIPTION OF THE INVENTION

The present invention which will be further described in the following examples.

Various silicas were coated with different waxes using the following process.

Blends of silica feedstock and the appropriate wax (of particle size similar to that of the amorphous silica) were fed to an AFG 200 fluid bed mill (supplied by Alpine AG, Augsburg, Germany), operating at an air inlet temperature of 180° C., the classifier speed and feed rate being set commensurate with obtaining a micronised product with a weight mean particle size in desired range.

Amorphous coated silicas having the following characteristics were produced.

| | PV (*) (cm³/g) | APS (**) (μm) | Coating | Wax content (%) |
|---|---|---|---|---|
| Ex. 1 | 1.2 | 8.4 | None | |
| Ex. 2 | 1.2 | 8.8 | Ternary blend (1) | 10.0 |
| Ex. 3 | 1.2 | 8.7 | Microcrystalline (2) | 11.4 |
| Ex. 4 | 1.2 | 8.2 | Polyethylene (3) | 6.0 |
| Ex. 5 | 1.2 | 8.1 | Polyethylene (3) | 11.4 |
| Ex. 6 | 1.8 | 9.2 | Microcrystalline | 13.2 |
| Ex. 7 | 1.8 | 7.2 | Microcrystalline | 8.7 |
| Ex. 8 | 1.8 | 6.9 | Ternary blend | 14.8 |
| Ex. 9 | 1.8 | 6.7 | Polyethylene (3) | 6.0 |
| Ex. 10 | 1.8 | 7.2 | Polyethylene (3) | 11.6 |
| Ex. 11 | 1.8 | 7.4 | Polyethylene (4) | 11.1 |
| Ex. 12 | 1.8 | 8.0 | Polyethylene (5) | 12.9 |
| Ex. 13 | 1.8 | 7.4 | Polyethylene (6) | 12.2 |
| Ex. 14 | 1.8 | 7.3 | Polyethylene (7) | 10.4 |
| Ex. 15 | 2.5 | 9.0 | Polyethylene (3) | 5.6 |
| Ex. 16 | 2.5 | 8.3 | Polyethylene (3) | 13.4 |
| Ex. 17 | 2.5 | 3.9 | Polyethylene (3) | 12.3 |
| Ex. 18 | 2.5 | 7.7 | Microcrystalline | 8.1 |

(*) Pore volume of the uncoated amorphous silica
(**) Average Particle Size of the coated silica (1) as disclosed in EP-A-541,359
(2) obtainable from Petrolite under the tradename Crown 700
(3) obtainable from Petrolite under the tradename Polywax 400 (melting point 79.5° C.)
(4) obtainable from Petrolite under the tradename Polywax 500 (melting point 88° C.)
(5) obtainable from Petrolite under the tradename Polywax 655 (melting point 99° C.)
(6) obtainable from Petrolite under the tradename Polywax 1000 (melting point 113° C.)
(7) obtainable from Petrolite under the tradename Polywax 2000 (melting point 126° C.)

Then the matting efficiency at 60° and 85° was measured for the two formulations 1 & 2. The results are summarized in the following table, a low number indicates a good matting effect.

| | Formulation 1 | | Formulation 2 | |
|---|---|---|---|---|
| | 60° | 85° | 60° | 85° |
| Ex.1 | 85 | 96 | 86 | 100 |
| Ex.2 | 82 | 90 | 85 | 96 |
| Ex.3 | 83 | 97 | 80 | 95 |
| Ex.4 | 91 | 95 | 81 | 94 |
| Ex.5 | 88 | 98 | 85 | 96 |
| Ex.6 | 88 | 90 | 84 | 90 |
| Ex.7 | 80 | 95 | 85 | 96 |
| Ex.8 | 88 | 90 | 78 | 95 |
| Ex.9 | 91 | 93 | 75 | 93 |
| Ex.10 | 54 | 93 | 9 | 32 |
| Ex.11 | 77 | 98 | 57 | 92 |
| Ex.12 | 89 | 101 | 75 | 90 |
| Ex.13 | 88 | 99 | 82 | 99 |
| Ex.14 | 88 | 96 | 83 | 97 |
| Ex.15 | 60 | 95 | 27 | 79 |
| Ex.16 | 57 | 98 | 13 | 55 |
| Ex.17 | 71 | 98 | 20 | 76 |
| Ex.18 | 91 | 92 | 83 | 90 |

As it can be seen, only examples 10, 15, 16 and 17 present good matting properties.

From examples 1 to 5, it can be seen that irrespective of the coating which is used, no satisfactory matting properties are obtained. Examples 1 to 5 are characterized by a pore volume of 1.2 cm³/g.

In examples 6 to 14 (pore volume of 1.8 cm³/g), only example 10 gives satisfactory matting properties whereas the only difference between example 10 and example 9 is the wax content of the silica, proving at a pore volume of 1.8 cm³/g, a wax content of 6% is not enough to give the desired matting properties.

In examples 10 to 14 (various polyethylene wax types), only example 10 gives satisfactory matting performance, proving that the type of polyethylene wax, as defined by its melting point, is critical.

In examples 15 to 18 (pore volume of 2. 5 cm³/g), examples 15 to 17 gives satisfactory matting properties, even at low loading (example 15), whereas example 18, even though at 8.1% loading does not give the required properties.

What is claimed is:

1. A wax is one having a melting point of less than 85° C. and coated silica matting agent in which the silica is an amorphous silica and the wax is a synthetic polyethylene wax, characterised in that the silica has a pore volume of at least 1.5 cm³/mg and the wax is present in an amount up to 15% by weight of the matting agent, the pore volume and wax content being such that a matting efficiency of less than 57 gloss units at an incidence angle of 60° is obtained when the wax coated silica is incorporated in an amount of 5.4% by weight in a urethane acrylate formulation defined herein as Formulation 2.

2. A wax coated silica matting agent in which the silica is an amorphous silica and the wax is a synthetic polyethylene wax, characterised in that the silica has a pore volume of at least 1.5 cm$^3$/mg and the wax is one having a melting point of less than 85° C. and is present in the range of 5.6 to 15% by weight of the matting agent, with the proviso that, for silica having a pore volume of 1.8 cm$^3$/mg or less, the wax content is in excess of 6% by weight of the matting agent.

3. A matting agent as claimed in claim 2 in which the pore volume and wax content is such that a matting efficiency of less than 57 gloss units at an incidence angle of 60° is obtained when the wax coated silica is incorporated in an amount of 5.4% by weight in a urethane acrylate formulation defined herein as Formulation 2.

4. A matting agent as claimed in claim 1 or 2 in which the silica has a pore volume of at least 1.8 cm$^3$/mg.

5. A matting agent as claimed in claim 1 or 2 in which the silica has a pore volume of up to 2.5 cm$^3$/mg.

6. A matting agent as claimed in claim 1 or 2 in which the wax coating is present in the range of 6 to 15% by weight of the matting agent.

7. A matting agent as claimed in claim 1 or 2 in which the wax coating is present in the range of 10 to 15% by weight of the matting agent.

8. A matting agent as claimed in claim 1 or 2 in which the pore volume and wax content is such that a matting efficiency of up to 27 gloss units at an incidence angle of 60° is obtained when the wax coated silica is incorporated in an amount of 5.4% by weight in a urethane acrylate formulation.

9. A matting agent as claimed in claim 1 or 2 in which the pore volume and wax content is such that a matting efficiency of up to 20 gloss units at an incidence angle of 60° is obtained when the wax coated silica is incorporated in an amount of 5.4% by weight in a urethane acrylate formulation.

10. A matting agent as claimed in claim 1 or 2 in which the melting point of the wax is less than 80° C.

11. A UV curable system containing from 3 to 15% by weight of a matting agent as claimed in claim 1 or 2.

12. A UV curable system comprising 3 to 15% by weight of a matting agent in the form of a synthetic wax coated amorphous silica, the silica having a pore volume of at least 1.5 cm$^3$/mg and the wax is one having a melting point of less than 85° C. and the wax coating being present in an amount in the range of 5.6 to 15% by weight of the matting agent, with the proviso that, for silica having a pore volume of 1.8 cm$^3$/mg or less, the wax content is in excess of 6% by weight of the matting agent.

* * * * *

UNITED STATES PATENT AND TRADEMARK OFFICE
CERTIFICATE OF CORRECTION

PATENT NO. : 6,039,798
DATED : March 21, 2000
INVENTOR(S) : Aldcroft et al.

It is certified that error appears in the above-identified patent and that said Letters Patent is hereby corrected as shown below:

Column 4, line 59 delete "is one having a melting point of less than 85°C. and"

Column 4, line 63 delete "$cm^3/mg$" and insert --$cm^3/g$--.

Column 4, line 63 after "wax" insert --is one having a melting point of less than 85°C. and--.

Column 5, line 6 delete "$cm^3/mg$" and insert --$cm^3/g$--.

Column 5, line 9 delete "$cm^3/mg$" and insert --$cm^3/g$--.

Column 5, line 13 delete "$cm^3/mg$" and insert --$cm^3/g$--.

Column 5, line 20 delete "$cm^3/mg$" and insert --$cm^3/g$--.

Column 6, line 10 after "synthetic" insert --polyethylene--.

Column 6, line 20 delete "$cm^3/mg$" and insert --$cm^3/g$--.

Column 6, line 24 delete "$cm^3/mg$" and insert --$cm^3/g$--.

Signed and Sealed this

Twentieth Day of February, 2001

NICHOLAS P. GODICI

Attest:

Attesting Officer

Acting Director of the United States Patent and Trademark Office